United States Patent
Franca et al.

(10) Patent No.: US 11,407,038 B2
(45) Date of Patent: Aug. 9, 2022

(54) TOOL CUTTING ELEMENT

(71) Applicant: Element Six (UK) Limited, Oxfordshire (GB)

(72) Inventors: Luiz Fernando Penna Franca, Oxfordshire (GB); Christopher John Howard Wort, Oxfordshire (GB); Jonathan Christopher Newland, Oxfordshire (GB); William Wayne Leahy, Oxfordshire (GB)

(73) Assignee: Element Six (UK) Limited, Oxfordshire (GB)

( * ) Notice: Subject to any disclaimer, the term of this patent is extended or adjusted under 35 U.S.C. 154(b) by 0 days.

(21) Appl. No.: 16/754,305

(22) PCT Filed: Feb. 8, 2019

(86) PCT No.: PCT/EP2019/053173
§ 371 (c)(1),
(2) Date: Apr. 7, 2020

(87) PCT Pub. No.: WO2019/155004
PCT Pub. Date: Aug. 15, 2019

(65) Prior Publication Data
US 2020/0238393 A1 Jul. 30, 2020

(30) Foreign Application Priority Data
Feb. 9, 2018 (GB) ...................................... 1802112

(51) Int. Cl.
*B24D 3/02* (2006.01)
*B23B 27/20* (2006.01)
(Continued)

(52) U.S. Cl.
CPC ........ *B23B 27/20* (2013.01); *B23B 2260/128* (2013.01)

(58) Field of Classification Search
USPC .......................................... 51/293, 307, 309
See application file for complete search history.

(56) References Cited

U.S. PATENT DOCUMENTS

| 4,511,783 A | 4/1985 | Burgemeister |
| 6,456,054 B1 | 9/2002 | Kataoka |

(Continued)

FOREIGN PATENT DOCUMENTS

| CN | 103348086 A | 10/2013 |
| DE | 10220755 A1 | 11/2002 |

(Continued)

OTHER PUBLICATIONS

Poco Graphite, "Properties and Characteristics of Graphite Brochure," Jan. 2015, see pp. 22 and 23 (40 pages).

(Continued)

*Primary Examiner* — James E McDonough
(74) *Attorney, Agent, or Firm* — Armstrong Teasdale LLP

(57) ABSTRACT

A cutting element (1) for a tool with an electrically conductive track (6) formed at a surface region. The cutting element (1) comprises a HPHT produced polycrystalline diamond body. The conductive track (6) comprises graphite such that the electrically conductive track (6) has an electrical resistance substantially lower than that of the surface region.

16 Claims, 2 Drawing Sheets

S1. Provide HPHT diamond with surface region

S2. Laser ablate surface region to graphitize diamond and form conductive surface track

(51) Int. Cl.
  *B24D 3/00* (2006.01)
  *B24D 11/00* (2006.01)
  *B24D 18/00* (2006.01)
  *C09K 3/14* (2006.01)

(56) References Cited

U.S. PATENT DOCUMENTS

| | | | |
|---|---|---|---|
| 2003/0017018 A1 | 1/2003 | Fukano | |
| 2009/0098814 A1* | 4/2009 | Sung | B24D 3/20 451/36 |
| 2016/0130883 A1* | 5/2016 | Alkhalaileh | C22C 26/00 175/57 |
| 2017/0320144 A1 | 11/2017 | Nishibayashi et al. | |

FOREIGN PATENT DOCUMENTS

| | | |
|---|---|---|
| EP | 1186365 A1 | 3/2002 |
| EP | 3106260 A1 | 12/2016 |
| JP | H08197309 A | 8/1996 |
| JP | 2002066808 A | 3/2002 |
| JP | 2002292504 A | 10/2002 |
| JP | 2016026995 A | 2/2016 |
| JP | 2016074572 A | 5/2016 |
| WO | 2012074755 A2 | 6/2012 |
| WO | WO-2012074755 A2 * | 6/2012 ............. E21B 47/00 |
| WO | 2016068231 A1 | 5/2016 |
| WO | 2016202569 A1 | 12/2016 |

OTHER PUBLICATIONS

Combined Search and Examination Report issued for GB1802112.1 dated Aug. 1, 2018 (8 pages).
Combined Search and Examination Report issued for GB1901776.3 dated Jul. 12, 2019 (8 pages).
International Search Report and Written Opinion issued for PCT/EP2019/053173 dated Feb. 8, 2019 (13 pages).

* cited by examiner

TOOL CUTTING ELEMENT

CROSS-REFERENCE TO RELATED APPLICATIONS

This application is the § 371 national stage of International Application No. PCT/EP2019/053173, filed Feb. 8, 2019, which claims priority to Great Britain Application No. 1802112.1, filed Feb. 9, 2018.

FIELD OF INVENTION

The invention relates to the field of cutting elements for tools, and methods of producing cutting elements for tools.

BACKGROUND OF INVENTION

Cutter inserts for machining and other tools typically comprise a layer of polycrystalline diamond (PCD) bonded to a cemented carbide substrate. PCD is an example of a super hard material, also called super abrasive material, which has a hardness value substantially greater than that of cemented tungsten carbide.

Components comprising PCD are used in a wide variety of tools for cutting, machining, drilling or degrading hard or abrasive materials such as rock, metal, ceramics, composites and wood-containing materials. PCD typically comprises a mass of substantially inter-grown cubic diamond grains forming a skeletal mass, which defines interstices between the cubic diamond grains. PCD material comprises at least about 80 volume % of diamond and can be made by subjecting an aggregated mass of diamond grains to an ultra-high pressure of greater than about 5 GPa, typically about 5.5 GPa, and temperature of at least about 1200° C., typically about 1440° C., in the presence of a sintering aid, also referred to as a catalyst material for diamond. Catalyst material for diamond is understood to be material that is capable of promoting direct inter-growth of diamond grains at a pressure and temperature condition at which diamond is thermodynamically more stable than graphite.

Examples of catalyst materials for diamond are cobalt, iron, nickel and certain alloys including alloys of any of these elements. PCD may be formed on a cobalt-cemented tungsten carbide substrate, which may provide a source of cobalt catalyst material for the PCD. During sintering of the body of PCD material, a constituent of the cemented-carbide substrate, such as cobalt from a cobalt-cemented tungsten carbide substrate, liquefies and sweeps from a region adjacent the volume of diamond particles into interstitial regions between the diamond particles. In this example, the cobalt acts as a catalyst to facilitate the formation of bonded diamond grains. Optionally, a metal-solvent catalyst may be mixed with diamond particles prior to subjecting the diamond particles and substrate to a high pressure high temperature (HPHT) process. The interstices within PCD material may at least partly be filled with the catalyst material. The inter-grown diamond structure therefore comprises original diamond grains as well as a newly precipitated or re-grown diamond phase, which bridges the original grains. In the final sintered structure, catalyst/solvent material generally remains present within at least some of the interstices that exist between the sintered diamond grains.

In drilling operations, a cutting tool insert is subjected to heavy loads and high temperatures at various stages of its useful life. In the early stages of drilling, when the sharp cutting edge of the insert contacts the subterranean formation, the cutting tool is subjected to large contact pressures. This results in the possibility of a number of fracture processes such as fatigue cracking being initiated. As the cutting edge of the insert wears, the contact pressure decreases and is generally too low to cause high energy failures. However, this pressure can still propagate cracks initiated under high contact pressures and can eventually result in spalling-type failures. In the drilling industry, PCD cutter performance is determined by a cutters ability to achieve high penetration rates in increasingly demanding environments, and still retain a good condition post-drilling (hence enabling re-use). In any drilling application, cutters may wear through a combination of smooth, abrasive type wear and spalling/chipping type wear. Whilst a smooth, abrasive wear mode is desirable because it delivers maximum benefit from the highly wear-resistant PCD material, spalling or chipping type wear is unfavourable. Even fairly minimal fracture damage of this type can have a deleterious effect on both cutting life and performance.

With spalling-type wear, cutting efficiency can be rapidly reduced as the rate of penetration of the drill bit into the formation is slowed. Once chipping begins, the amount of damage to the diamond table continually increases, as a result of the increased normal force now required to achieve a given depth of cut. Therefore, as cutter damage occurs and the rate of penetration of the drill bit decreases, the response of increasing weight on bit can quickly lead to further degradation and ultimately catastrophic failure of the chipped cutting element.

Similar problems exist in the machining industry. PCD may be used to machine non-ferrous materials in operations such as cutting and turning. Again, chipping greatly affects the lifetime of the PCD cutting element and also the quality and finish of the workpiece being machined.

When optimising PCD cutter performance, increasing wear resistance in order to achieve better cutter life is typically achieved by manipulating variables such as average diamond grain size, overall catalyst/solvent content, diamond density and the like. Typically, however, as PCD material is made more wear resistant it becomes more brittle or prone to fracture. PCD elements designed for improved wear performance will therefore tend to have poor impact strength or reduced resistance to spalling. This trade-off between the properties of impact resistance and wear resistance makes designing optimised PCD structures, particularly for demanding applications, inherently self-limiting.

PCD cutting elements are typically provided with a usable lifetime (which may be measured in terms of time, metres cut, number of operations etc.). As chipping is a brittle process, the performance of an individual cutting element may greatly exceed that of another individual cutting element, and this effect is difficult to predict. In order to avoid damage to tooling or workpieces, this usable lifetime typically has a cautious value that is significantly lower than the actual lifetime a given tool may achieve.

There is currently a drive to apply sensors to tools to measure parameters such as temperature, chipping, vibration and so on. The data obtained by these sensors can be used to more accurately measure cutting element life, leading to less risk of damaging workpieces and a greater usable lifetime for each cutting element.

SUMMARY OF INVENTION

If a sensor is applied to a cutting element, the data collected by the sensor must be provided in a usable format to a user. It is an object of the invention to provide a way of sending data from a sensor on a cutting element to an output.

According to a first aspect, there is provided a cutting element for a tool. The cutting element comprises a high pressure-high temperature (HPHT) polycrystalline diamond (PCD) body comprising a surface region. An electrically conductive track is formed at the surface region, the conductive track comprising graphite, wherein the electrically conductive track has an electrical resistance substantially lower than that of the surface region. An advantage of this is that the electrically conductive track can be used to carry an electrical signal.

As an option, the conductive track has a width of at least three times the average diamond grain size.

As an option, at least one end of the conductive track is connected to a sensor located on the cutting element. An advantage of this is that data can be collected at the sensor and a signal carrying the data carried across the PCD.

As an option, at least one end of the conductive track is connected to a data collection element. This allows data in an electrical signal, for example data collected from a sensor, to be collected and further sent to a device such as a computer.

As an option, the HPHT PCD body comprises a substantially non-conducting surface region. This can be achieved, for example, by leaching away any conducting material such as cobalt from the surface of the PCD.

The conductive track is optionally disposed on any of a rake face and a clearance face.

According to a second aspect, there is proved a tool comprising the cutting element as described above in the first aspect.

Optional examples of such a tool include any of a drill bit, a milling tool, a turning tool, a boring tool, a reaming tool, a wire drawing die, a mining pick tool, a road milling pick tool, and a downhole drill bit.

According to a third aspect, there is provided a method of making a cutting element for a tool. The method comprises providing an HPHT PCD comprising a surface region. A conductive track is formed at the surface region, the conductive track comprising graphite, wherein the electrically conductive track has an electrical resistance substantially lower than that of the surface region.

As an option, the conductive track is formed by laser ablation of the diamond at the surface region.

As a further option, the laser ablation is performed using a Nd:YAG laser having a power of between 8 and $14 \times 10^6$ Wcm$^{-2}$.

As a further option, wherein the laser ablation is pulsed at a frequency of between 20 and 100 kHz and a pulse duration of between 5 and 20 μs.

As a further option, the laser ablation is performed at a speed of between 200 and 500 mms$^{-1}$ along the substantially non-conductive surface region.

As an option, the method further comprises removing conductive binder material located at the surface region, the removal being performed by leaching. As a further option, the method comprises leaching away conductive binder material from the entire polycrystalline diamond body.

The method optionally comprises connecting one end of the conductive track to a sensor located on the cutting element.

As an option, the method comprises connecting at least one end of the conductive track to a data collection element.

BRIEF DESCRIPTION OF THE DRAWINGS

For a better understanding of the present invention and to show how the same may be carried into effect, embodiments of the present invention will now be described by way of example only with reference to the accompanying drawings, in which.

DETAILED DESCRIPTION

Different types of sensors may be attached to a PCD cutting element. Examples of such sensors include thermocouples, vibration sensors, and wear sensors. In order to carry an electrical signal from a sensor to a data collection element, a conductive pathway is required. One way to apply a conductive pathways is to apply a layer of conductive metal, such as silver, to the surface of the PCD in such a way that the conductive metal extends between a sensor and a data collection element.

A problem with printing a metal conductive pathway onto the surface of the PCD is that the adhesion between the silver and the PCD is poor. Silver can easily be scraped off or otherwise mechanically removed. In a challenging or aggressive environment, such as around a machine tool or during a downhole drilling operation, it is very difficult to maintain a continuous conductive pathway of silver on the surface of the PCD.

It has surprisingly been found that laser ablation of a PCD surface causes sufficient graphitization at the surface to form a conductive track. It has also been surprisingly found that the graphite conductive region is sufficiently adhered to the underlying PCD body to form a continuous conductive pathway even under aggressive machining conditions.

Figure 1:
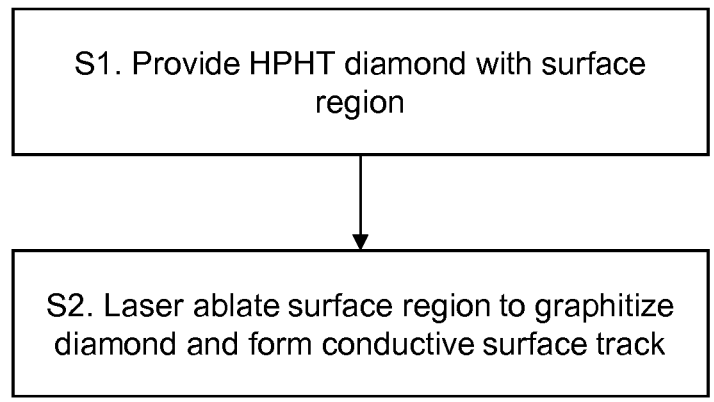
FIG. 1 is a flow diagram showing exemplary steps.

FIG. 1 is a flow diagram illustrating steps in forming a cutting element for a tool. The following numbering corresponds to that of FIG. 1.

S1. An HPHT PCD diamond cutting element is provided.

S2. Laser ablation is performed on the surface of the cutting element. The carbon in the PCD is in the form of diamond, and laser ablation converts some of the diamond carbon to the graphite form of carbon, thereby forming an electrically conductive track. The resistivity of graphite is around $1 \times 10^{-5}$ ohm·cm, making graphite a good conductor of electricity. The graphite track can therefore be used to carry data in the form of an electric signal.

Figure 2:
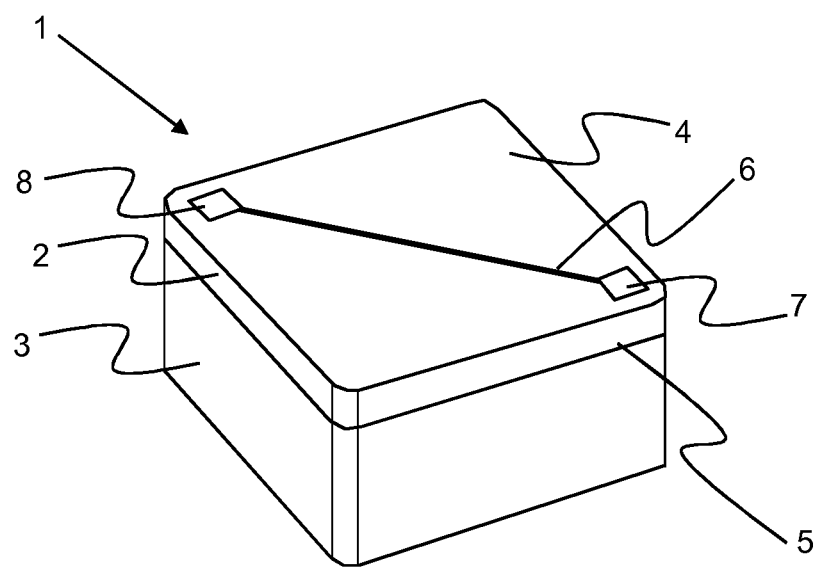
FIG. 2 is a perspective view of an exemplary cutting element.

An exemplary cutting element 1 is shown in FIG. 2. The cutting element 1 comprises a PCD layer 2 bonded to a support substrate 3. The support substrate 3 may be any suitable material, such as cemented tungsten carbide. The PCD layer 2 has a top (or rake) face 4, and a clearance face 5.

Initially, the PCD contains cobalt in the interstices between diamond grains. The cutting element 1 in one exemplary embodiment is therefore leached in HCl to remove cobalt close to the surface of the top face 4 and the clearance face 5, in order to increase the resistivity of the surface region and improve the electrical isolation of the electrically conductive track 6. A protective element such as an acid resistant tape (e.g. polyamide with a silicone adhesive) is used to protect the cemented tungsten carbide substrate 3 from the HCl. In this example, it was found that leaching in equal volumes of deionized water and HCl at 107° C. for several hours removed sufficient cobalt from the surface of the PCD to make it effectively non-conducting.

Electrically conductive tracks were applied by using a Nd:YAG Q-switched high frequency laser. A power of between 10 and $12\times10^6$ Wcm$^{-2}$ was used, at a frequency of 50 kHz, a pulse duration of 10 μs and a speed of 300 to 400 mms$^{-1}$.

The electrically conductive track 6 was applied using the pulsed laser. Note that the track is shown as being applied on the top face 4 of the PCD layer 2. However, the track could also be applied on the clearance face 5 of the PCD layer 2, or could trace a path that includes both the top face 4 and the clearance face 5. The laser ablation energy was sufficient to form a trench in the surface of the PCD layer 2, and to convert diamond to graphite.

As PCD is a polycrystalline structure, and the removal of cobalt leaves pores, it is thought that the width of the ablated electrically conductive track 6 should be at least three times the average diamond grain size of the PCD to ensure that there are no breaks in the electrically conductive tracks that would otherwise affect the ability of the electrically conductive track to carry an electrical signal.

In the embodiment of FIG. 2, a sensor 7 is provided towards the cutting tip of the cutting element 1. Exemplary sensors include wear sensors, vibration sensors, temperature sensors and so on.

A data collection element 8 is also provided, which is an element that allows collected data to be moved to a storage device or a computer device for analysis of the data. The electrically conductive track 6 extends between the sensor 7 and the data collection element 8 so that data collected from the sensor can be transferred to the data collection element 8.

While the above embodiment describes the process of leaching the surface region of the PCD to lower its conductivity, this step is not always necessary. In order for the graphite track to carry a usable signal, it is simply enough that the surface region has a sufficiently higher resistivity than that of the graphite track. Signals have been carried using electrically conducting graphite tracks applied to the surface of unleached PCD, which contains cobalt. As mentioned above, the resistivity of graphite is around $1\times10^{-5}$ ohm·cm, whereas the resistivity of unleached PCD (containing around 8% cobalt) is typically around $1\times10^{-1}$ ohm·cm. This difference in resistivity is sufficient to allow the electrically conductive graphite track to carry a data signal.

PCD is a brittle material and wear or chipping can occur. For this reason, the working life of a cutting element is based on recommended times, at which point the cutting element is changed. However, a cutting element may, after this predetermined time, still have many potential hours of use. By using sensors to monitor conditions of the cutting element 1, the tool life can be more accurately monitored and the tool replaced shortly before an unacceptable amount of wear has occurred. This greatly increases the working life of cutting elements.

Surprisingly, it has been found that the electrically conductive track can be used indirectly to measure temperature. Resistance Temperature Detectors (RTD) are typically metallic and constructed from materials such as platinum, copper or nickel. These materials have a repeatable resistance versus temperature relationship. The resistance increases as the temperature increases. In contrast, it has been found that the graphite tracks display a resistance that decreases as the temperature increases. This behaviour is commonly observed in semiconductor materials.

Figure 3:
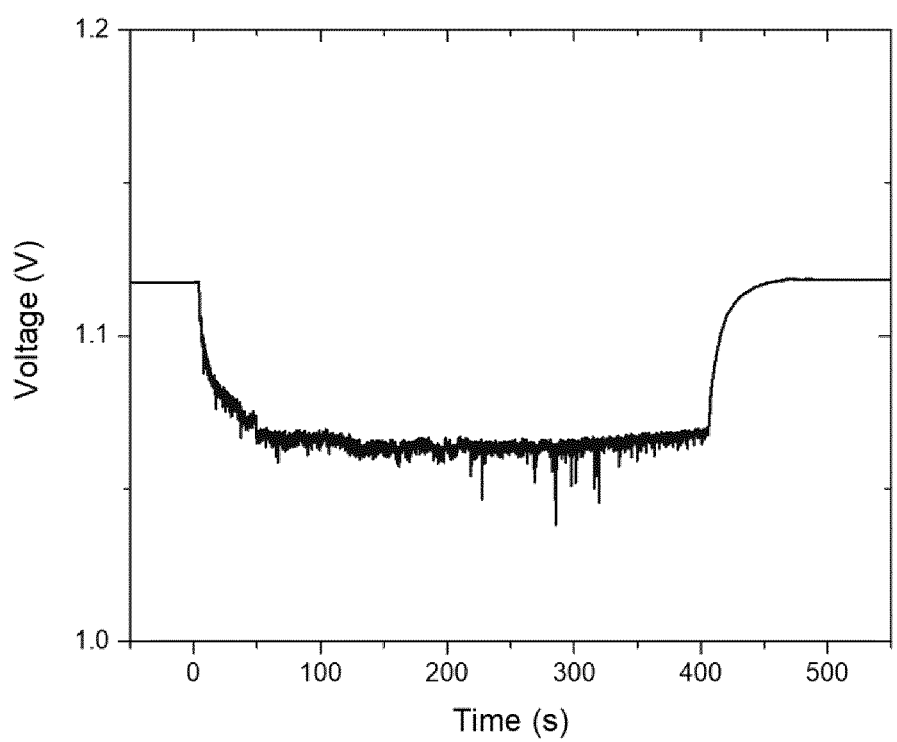
FIG. 3 is a graph showing measured voltage across an electrically conductive graphite track on PCD as a function of time during a cutting operation using the PCD.

This effect is illustrated in FIG. 3; a PCD cutting element was made with a graphitized track on the rake face. An electrical signal was applied to the graphitized track with a voltage just above 1.1 V. The cutting element was used to cut a work piece. The cutting operation lasted for 400 seconds. As can be seen from FIG. 3, the voltage quickly dropped once the cutting operation started. This is because the temperature of the cutting element increased. Resistance is directly proportional to voltage, and the resistance can be related to the resistivity of the electrically conductive graphite track using the length and the cross-section area of the electrically conductive graphite track. The resistivity of graphite as a function of temperature is known (for example, see Poco Graphite, Properties and Characteristics of Graphite, page 22 and 23, www.http://poco.com/Portals/0/Literature/Semiconductor/IND-109441-0115.pdf, accessed 6 Feb. 2018). The resistivity of graphite does not change linearly with temperature, and so a calibration must be performed for an electrically conductive graphite track of known dimensions. After calibration, the voltage can be used to obtain an indication of the temperature of the electrically conductive graphite track, and so the electrically conductive graphite track itself becomes a temperature sensor.

Certain terms and concepts as used herein will be briefly explained.

As used herein, super-hard or ultra-hard material has Vickers hardness of at least 25 GPa. Synthetic and natural diamond, polycrystalline diamond (PCD), cubic boron nitride (CBN) and polycrystalline CBN (PCBN) material are examples of super-hard materials. Synthetic diamond, which may also be called man-made diamond, is diamond material that has been manufactured. A PCD structure comprises or consists of PCD material. Other examples of super-hard materials include certain composite materials comprising diamond or CBN grains held together by a matrix comprising ceramic material, such as silicon carbide (SiC), or by cemented carbide material such as Co-bonded WC material. For example, certain SiC-bonded diamond materials may comprise at least about 30 volume per cent diamond grains dispersed in a SiC matrix (which may contain a minor amount of Si in a form other than SiC).

In general and as used herein, catalyst material for super-hard material is capable of promoting the sintering of polycrystalline material comprising grains of the super-hard material, at least at a pressure and temperature at which the super-hard material is thermodynamically stable. The catalyst material may be capable of promoting the direct inter-growth of grains of the super-hard material and or more generally the sintering of the grains of the super-hard material to form the polycrystalline material. In some examples, the catalyst material may function as a binder material capable of forming a sintered matrix, on its own or in combination with other suitable material, within which the super-hard grains may be dispersed and not necessarily directly inter-bonded with each other. For example, catalyst material for synthetic diamond is capable of promoting the growth of synthetic diamond grains and or the direct inter-growth of synthetic or natural diamond grains at a temperature and pressure at which synthetic or natural diamond is thermodynamically more stable than graphite.

Examples of catalyst materials for diamond are Fe, Ni, Co and Mn, and certain alloys including these. Catalyst or binder material for PCBN material may comprising a Ti-containing compound, such as titanium carbide, titanium nitride, titanium carbonitride and or an Al-containing compound, such as aluminium nitride, and or compounds containing metal such as Co and or W, for example.

As used herein, polycrystalline diamond (PCD) material comprises a mass (an aggregation of a plurality) of diamond grains, a substantial portion of which are directly inter-bonded with each other and in which the content of diamond is at least about 80 volume per cent of the material. Interstices between the diamond grains may be at least partly filled with a binder material comprising a catalyst material for synthetic diamond, or they may be substantially empty. Bodies comprising PCD material may comprise at least a region from which catalyst material has been removed from the interstices, leaving interstitial voids between the diamond grains.

A machine tool is a powered mechanical device, which may be used to manufacture components comprising materials such as metal, composite materials, wood or polymers by machining, which is the selective removal of material from a body, called a work-piece. A machine tool may comprise a cutter insert (or simply "insert") comprising a cutter structure, and the insert may be indexable and or replaceable.

When a machine tool is in use machining a work-piece, pieces of the work-piece will likely be removed and these pieces are referred to as "chips". Chips are the pieces of a body removed from the work surface of the body by a machine tool in use. Controlling chip formation and directing chip flow are important aspects of tools for high productivity machining and or high surface finish machining of advanced alloys of aluminium, titanium and Nickel. The geometry of chip-breaker features may be selected according to various machining factors, such as the work piece material, cutting speed, cutting operation and surface finish required.

While this invention has been particularly shown and described with reference to embodiments, it will be understood by those skilled in the art that various changes in form and detail may be made without departing from the scope of the invention as defined by the appended claims.

The invention claimed is:

1. A cutting element for a tool, the cutting element comprising:
   a high pressure-high temperature polycrystalline diamond body comprising a surface region;
   an electrically conductive track formed at the surface region, the conductive track comprising graphite, wherein the electrically conductive track has an electrical resistance substantially lower than that of the surface region, and wherein the conductive track has a width of at least three times the average diamond grain size.

2. The cutting element according to claim 1, wherein at least one end of the conductive track is connected to a sensor located on the cutting element.

3. The cutting element according to claim 1, wherein at least one end of the conductive track is connected to a data collection element.

4. The cutting element according to claim 1, wherein the high pressure-high temperature polycrystalline diamond body comprises a substantially non-conducting surface region.

5. The cutting element according to claim 1, wherein the conductive track is disposed on any of a rake face and a clearance face.

6. A tool comprising the cutting element according to claim 1.

7. The tool according to claim 6, wherein the tool is selected from any of a drill bit, a milling tool, a turning tool, a boring tool, a reaming tool, a wire drawing die, a mining pick tool, a road milling pick tool, and a downhole drill bit.

8. A cutting element for a tool, the cutting element comprising a high pressure-high temperature polycrystalline diamond body comprising a surface region, and an electrically conductive track formed at the surface region, the conductive track comprising graphite, wherein the electrically conductive track has an electrical resistance substantially lower than that of the surface region, the cutting element made by a method comprising:
   providing a high pressure-high temperature polycrystalline diamond body comprising a surface region;
   forming a conductive track at the surface region, the conductive track comprising graphite, wherein the electrically conductive track has an electrical resistance substantially lower than that of the surface region.

9. The cutting element according to claim 8, wherein the conductive track is formed by laser ablation of the diamond at the surface region.

10. The cutting element according to claim 9, wherein the laser ablation is performed using a Nd:YAG laser having a power of between 8 and $14 \times 10^6$ Wcm$^{-2}$.

11. The cutting element according to claim 9 or 10, wherein the laser ablation is pulsed at a frequency of between 20 and 100 kHz and a pulse duration of between 5 and 20 µs.

12. The cutting element according to any one of claim 9 or 10, wherein the laser ablation is performed at a speed of between 200 and 500 mms$^{-1}$ along a substantially non-conductive surface region.

13. The cutting element according to any one of claim 8 or 9, wherein the cutting element is made by the method further comprising removing conductive binder material located at the surface region, the removal being performed by leaching.

14. The cutting element according to any one of claim 8 or 9, wherein the cutting element is made by the method further comprising leaching away conductive binder material from the polycrystalline diamond body.

15. The cutting element according to any one of claim 8 or 9, wherein the cutting element is made by the method further comprising connecting one end of the conductive track to a sensor located on the cutting element.

16. The cutting element according to any one of claim 8 or 9, wherein the cutting element is made by the method further comprising connecting at least one end of the conductive track to a data collection element.

\* \* \* \* \*